C. C. BARBER.
KEY FOR FASTENING GEAR WHEELS, RACEWAYS FOR BALL BEARINGS, AND THE LIKE TO ROTATABLE SHAFTS.
APPLICATION FILED NOV. 30, 1920.

1,400,014.

Patented Dec. 13, 1921.

Inventor:
Charles C. Barber
by Joel C. Palmer
Atty.

UNITED STATES PATENT OFFICE.

CHARLES C. BARBER, OF BROOKLYN, NEW YORK, ASSIGNOR TO WESTERN ELECTRIC COMPANY, INCORPORATED, OF NEW YORK, N. Y., A CORPORATION OF NEW YORK.

KEY FOR FASTENING GEAR-WHEELS, RACEWAYS FOR BALL-BEARINGS, AND THE LIKE TO ROTATABLE SHAFTS.

1,400,014.                  Specification of Letters Patent.        Patented Dec. 13, 1921.

Application filed November 30, 1920. Serial No. 427,321.

*To all whom it may concern:*

Be it known that I, CHARLES C. BARBER, a citizen of the United States, residing at Brooklyn, in the county of Kings, State of New York, have invented certain new and useful Improvements in Keys for Fastening Gear-Wheels, Raceways for Ball-Bearings, and the like to rotatable shafts, of which the following is a full, clear, concise, and exact description.

This invention relates to a key for fastening the inner raceways of bearings, gear wheels and the like to a rotatable shaft.

The object of the invention is to produce a cheap and efficient key, so set that in case the bearing should seize for any reason, or the gear wheel should be overloaded, the grip of the key will be overcome before damage to other parts of the machinery occurs.

This invention consists of an elliptically shaped resilient key, which is placed in the key seat in the shaft, and is compressed when the bearing, gear wheel or the like is being moved into position. After the bearing, gear wheel or the like has reached its position, the arms of the key press against the inner bearing surface of the member and prevent motion thereof relative to the shaft.

Figure 1:
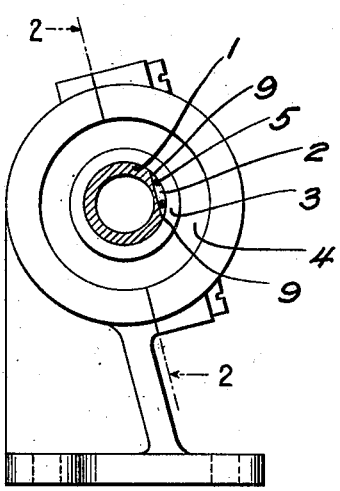
Figure 2:
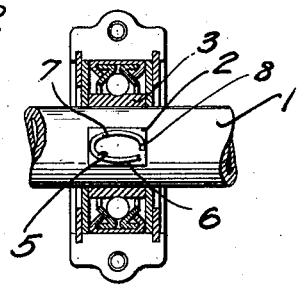
Figure 3:
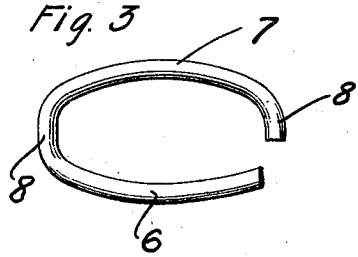

The construction of the invention will be more clearly understood by reference to the following specification and accompanying drawings. Figure 1 is a cross section at right angles to the shaft. Fig. 2 is a cross section along the line 2—2 of Fig. 1. Fig. 3 is a view of the friction key. Like numbers refer to like members in all the figures.

The friction key 5 which is made of resilient material formed into the shape of an elliptical link opened near one end of its major axis, has two arms 6 and 7. The longer arm 7 has a curved end 8, which prevents the binding of the ends of the key against the wall of the key seat, when the bearing is moved into position, which binding would not allow the key to expand and press into the V shaped corners 9 between the inner raceway and the shaft. The curved portion 8 of the longer arm 7 overlaps the end of the shorter arm 6, and thus allows the key to be compressed sufficiently to permit the bearing to be easily moved into position. A suitable shallow key seat 2 is milled in the shaft 1. 3 is the inner raceway of the bearing 4.

What is claimed is:

1. A friction key comprising an elliptical resilient link opened near one end of its major axis to divide said link into two arms.

2. A friction key comprising an elliptical resilient link open near one end of its major axis to divide said link into two arms, the longer arm being long enough to allow its curved portion to overlap the end of the shorter arm.

3. A device for fastening the inner raceway of a bearing to a shaft, consisting of a key seat in said shaft, a key comprising an elliptical resilient link open near one end of its major axis to divide said link into two arms.

4. A device for fastening the inner raceway of a bearing to a shaft, consisting of a key seat in said shaft, a key comprising an elliptical resilient link open near one end of its major axis to divide said link into two arms, the longer arm being made long enough to allow its curved portion to overlap the end of the shorter arm when the arms are pressed together.

In witness whereof, I hereunto subscribe my name this 20th day of November A. D., 1920.

CHARLES C. BARBER.